(12) United States Patent
Amit et al.

(10) Patent No.: US 6,967,965 B2
(45) Date of Patent: Nov. 22, 2005

(54) MULTI-USER NETWORK SYSTEM AND METHOD OF DATA COMMUNICATION USING ENHANCED PREAMBLE

(75) Inventors: Matitiyahu Amit, Zur-Yigal (IL); Liran Brecher, Jafa (IL)

(73) Assignee: Texas Instruments Incorporated, Dallas, TX (US)

(*) Notice: Subject to any disclaimer, the term of this patent is extended or adjusted under 35 U.S.C. 154(b) by 1041 days.

(21) Appl. No.: 09/849,332

(22) Filed: May 4, 2001

(65) Prior Publication Data

US 2002/0003807 A1    Jan. 10, 2002

Related U.S. Application Data

(60) Provisional application No. 60/217,048, filed on Jul. 10, 2000.

(51) Int. Cl.⁷ .............................................. H04J 3/16
(52) U.S. Cl. ...................... 370/437; 370/461; 370/462
(58) Field of Search ................................ 370/216–222, 370/241–246, 276–282, 310, 431, 432, 437, 370/458, 461, 462

(56) References Cited

U.S. PATENT DOCUMENTS

| | | | |
|---|---|---|---|
| 4,593,282 A * | 6/1986 | Acampora et al. | 340/825.5 |
| 4,682,324 A | 7/1987 | Ulug | |
| 4,726,018 A * | 2/1988 | Bux et al. | 370/455 |
| 4,745,600 A | 5/1988 | Herman et al. | |
| 4,766,536 A * | 8/1988 | Wilson et al. | 710/121 |
| 4,885,743 A | 12/1989 | Helbers et al. | |
| 5,351,241 A * | 9/1994 | Yehonatan | 370/446 |
| 5,453,987 A * | 9/1995 | Tran | 370/447 |
| 6,026,095 A * | 2/2000 | Sherer et al. | 370/448 |
| 6,501,764 B1 * | 12/2002 | Fudatate et al. | 370/445 |

* cited by examiner

*Primary Examiner*—Hassan Kizou
*Assistant Examiner*—Dmitry Levitan
(74) *Attorney, Agent, or Firm*—Abdul Zindani; W. James Brady, III; Frederick J. Telecky, Jr.

(57) ABSTRACT

A system and method of data communication for multiple stations using shared communication media within a network. A data communication message structure uses a preamble that includes both source and destination data. The message structure allows use of collision resolve logic to prioritize stations within the network such that the winner is the one with the highest priority. The destination preamble data allows each station to sample and store destination data to a buffer for decoding in the background where the station does not have to support the network data rate.

11 Claims, 1 Drawing Sheet

MULTI-USER NETWORK SYSTEM AND METHOD OF DATA COMMUNICATION USING ENHANCED PREAMBLE

This application claims priority under 35 USC §119 (e)(1) of Provisional Application No. 60/217,048, filed Jul. 10, 2000.

BACKGROUND OF THE INVENTION

1. Field of the Invention

This invention relates generally to data communication systems and methods, and more particularly to a system and method for communicating between subscribers over shared media and that provides collision avoidance, robust carrier sense, stable synchronization between stations, and data buffering and decoding in the background.

2. Description of the Prior Art

When using a data communication system based on bursts (packets), the generic format of a frame consists of a preamble at the beginning of each burst. Some communication protocols additionally include data and end-of-frame. The preamble is used to signify (recognize) the start of transmission. All nodes on a network traditionally use the same preamble and the same end-of-frame. Each node, therefore, is required to decode at least the beginning of the data to identify if this message is addressed to itself Decoding efforts importantly require a real-time computational complexity. Further, traditional data communication processes are made even more complex and time consuming due to the necessity to utilize collision detection and resolve techniques.

In view of the foregoing, a need exists for a scheme to reduce the time associated with collision resolve to increase the effective data communication rate between subscribers using shared media.

SUMMARY OF THE INVENTION

The present invention is directed to a system and method of differentiating individual stations in the PHY layer of a communication network. A technique is used wherein preambles are chosen such that they are easily recognized, even in a very noisy environment in which colliding stations are also considered as noise.

Each station on the net consists of a transmitter and a receiver, which are independent and operate at the same time. The foregoing preamble is used to enhance its traditional functionality discussed herein before, by also identifying the source and destination such that when two or more stations collide, each station will have the ability to immediately recognize the identity of the other stations. When such an event occurs, only one station will continue transmission while the others will stop in a short period of time. The present technique will therefore save the time of collision resolve and thus increase the effective data communication rate of the system.

In one aspect of the invention, a method and associated system are implemented using a unique node preamble to identify the source and the destination node.

In still another aspect of the invention, a method and associated structure are implemented using a unique node preamble to resolve a collision by stopping message transmission "immediately" following source node identification.

In yet another aspect of the invention, a method and associated structure are implemented using a unique node preamble to decode only messages that are addressed to the destination node.

Still another aspect of the invention is associated with a system and method implemented to save entire message samples to a buffer such that message decoding in the background can be achieved using a data processing device such as a CPU or DSP whenever a single node is not required to support the network data rate.

As used herein the following terms have the following meanings. The term "real-time" is used in the context of network data rate. The term "background" is used in the context of station data rate.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
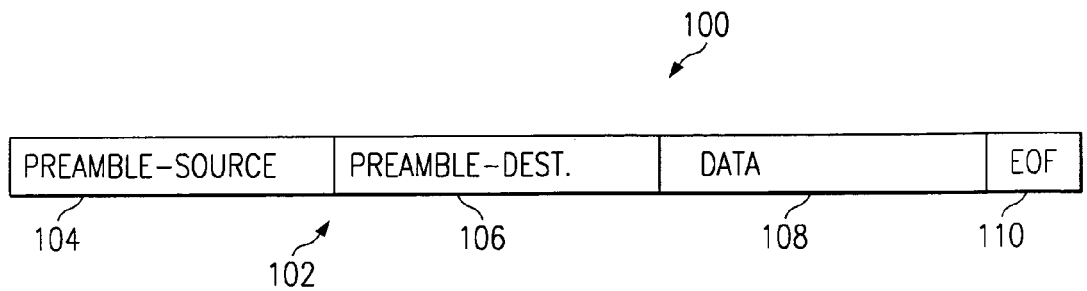
FIG. 1 is a radio frame structure according to one embodiment of the present invention.

FIG. 1 is a radio frame structure 100 according to one embodiment of the present invention. The radio frame structure 100 can be seen to have a preamble 102 that not only signifies the beginning of a data packet, but also has a first portion (source preamble) 104 that identifies a particular source and a second portion (destination preamble) 106 that identifies a particular destination. The radio frame structure 100 also has data 108 and an end-of-frame signifier 110. Since the radio frame structure 100 includes both a source preamble 104 and a destination preamble 106, each station can now recognize any other stations within the network. If a collision occurs between any of the stations within the network, only one station will continue transmission while the others will stop in a short period of time. Algorithms, such as discussed herein below, can be used by the individual stations to help them decide which stations should continue transmitting and which stations should stop transmitting. The effective communication data rate of the network will then increase due to a reduced time of collision resolve associated with the enhanced preamble. This reduced time of collision resolve, as stated herein before, is due to reduced decoding efforts since it is no longer necessary to decode any portion of the data 108 to identify if the particular message is addressed to a certain node within the network. Such previous decoding efforts have required complex real-time computations.

The radio frame structure 100 therefore enables differentiating stations in the PHY layer by implementing preamble that are easy to be recognized, even in a very noisy environment where colliding stations are also considered as noise. When a single node (station) is not required to support the network data rate, the entire message can be saved to a buffer for decoding in the station background using its local data processing device, e.g. CPU, DSP and the like. The present invention is not so limited however, and it shall be understood that the source and destination preambles 104, 106 can be implemented in any order or even interleaved, for example.

Figure 2:
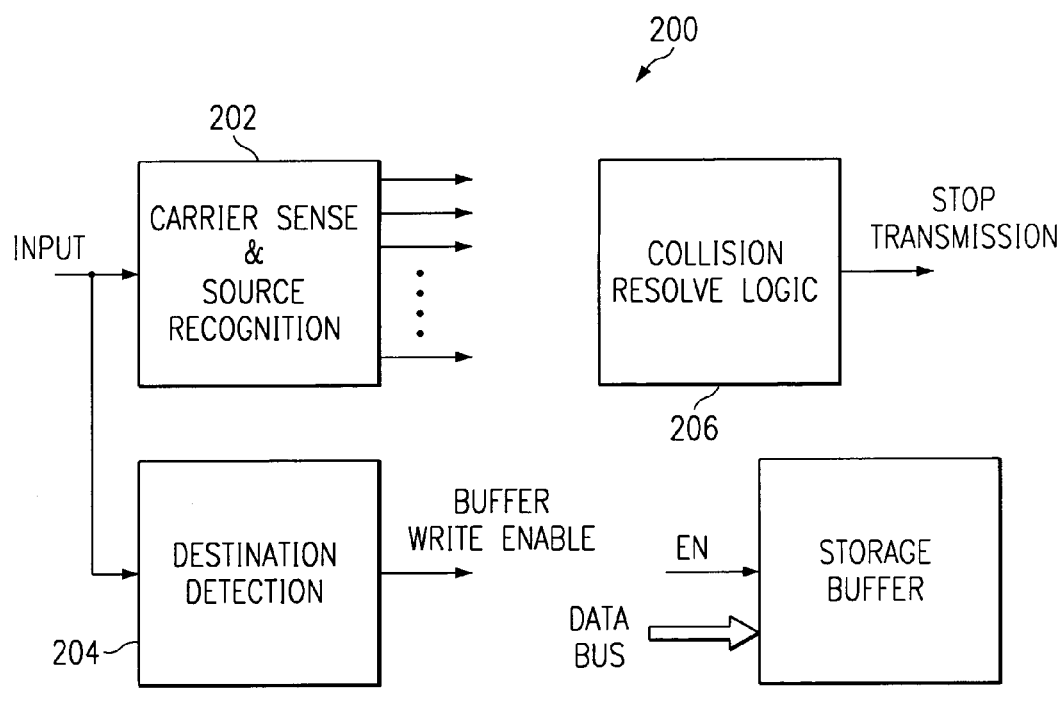
FIG. 2 is a simplified block diagram illustrating transceiver modules suitable for implementing carrier sense and source recognition, destination detection, and collision resolve for the radio frame structure shown in FIG. 1.

FIG. 2 is a simplified block diagram illustrating transceiver modules 200 suitable for implementing carrier sense and source recognition, destination detection, and collision resolve for the radio frame structure 100 shown in FIG. 1. The transceiver modules 200 include a carrier sense and source recognition module 202, a destination detection module 204, and a collision resolve logic module 206. It can be appreciated that a particular implementation of the carrier sense module 202 will determine the overall system performance. Generally, it is beneficial to reach maximum dynamic range in detection of the different preambles 104, 106, such that when two or more stations collide, the power levels might differ by several dB and the network will still be able to recognize the low level stations up to the noise limits.

In view of the foregoing, it can be appreciated that destination detection should be easier to implement since the possibly colliding sources will stop transmission earlier; and only the winning station will remain on the line (plus fading inter-symbol interference from the colliding stations). Most preferably, each station will detect only its own destination address to assert a buffer write enable to implement storage of burst samples into its associated memory devices.

The collision resolve logic 206 is implemented via algorithmic software, as stated herein before. According to one embodiment, predefined priorities are assigned to each station. When two or more stations collide, the winner will therefore be the one with the highest priority. According to another embodiment, predefined priorities are assigned to each station; but are dynamically changed during operation. During operation, the predefined station priorities between two stations can switch with one another, for example, each time the stations collide. In this way, a more symmetric communication can be implemented. It can be appreciated that the foregoing priority switching scheme can be extended to more than two colliding stations.

In view of the above, it can be seen the present invention presents a significant advancement in the art of communication between subscribers over shared media. An enhanced preamble has been implemented to achieve collision avoidance, robust carrier sense, good synchronization between stations, and data buffering and decoding in the background. Further, this invention has been described in considerable detail in order to provide those skilled in the data communication art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. For example, although various embodiments have been presented herein with reference to particular functional architectures and algorithmic characteristics, the present inventive structures and methods are not necessarily limited to such a particular architecture or set of characteristics as used herein. The present invention could just as well be implemented using any scheme that performs well for multiple users on a network based on an enhanced preamble.

What is claimed is:

1. A method of data communication between multiple stations on a network using shared media, the method comprising the steps of:
   assigning priorities to each station;
   transmitting at least one burst of network communication data, each burst having a source preamble and a destination preamble associated therewith;
   resolving collision among transmitting stations via algorithmic relationships between station priorities and source preambles; and
   detecting a destination station via the destination preamble, wherein the step of resolving collision further comprises switching station priorities between two transmitting stations each time the two transmitting stations collide.

2. The method according to claim 1 wherein the step of resolving collision comprises interrogating the source preambles and station priorities and halting transmission by stations having lesser priorities among the transmitting stations.

3. The method according to claim 1 wherein the step of detecting a destination comprises sampling the destination preamble and storing sampled destination preamble data in a storage buffer.

4. The method according to claim 4 wherein the step of detecting a destination further comprises decoding the stored sampled destination preamble data at a station data rate.

5. A data communication system comprising:
   a carrier sense and source recognition module having a data signal input and further having a plurality of source recognition outputs, the carrier sense and source recognition module configured to receive preamble source data at the data signal input and generate source data at the source recognition outputs therefrom;
   a collision resolve logic module configured to receive the source data at the source recognition outputs and associate station source priorities with the source data such that the collision resolve logic can prevent further data transmission by the data communication system when the data communication system has a priority that is less than a station source priority associated with the received preamble source data; and
   a destination detection module having a data signal input configured to receive and sample preamble destination data and generate a buffer write enable signal when the sampled preamble destination data is unique to the data communication system.

6. The data communication system according to claim 5 further comprising a data storage buffer having a signal input configured to receive the buffer write enable signal and further having data signal inputs such that the buffer write enable signal can cause the sampled preamble destination data to be stored in the data storage buffer.

7. The data communication system according to claim 5 further comprising an algorithmic software configured to assign unique priorities to different stations.

8. The data communication system according to claim 7 wherein the algorithmic software is further configured to exchange unique priorities between two colliding stations.

9. A data communication system comprising:

carrier sensing means for sensing a radio message transmitted by a transmitting and receiving station;

source recognition means for receiving preamble source data contained within the radio message and generating source recognition data therefrom;

collision resolving means for associating priority data with the source recognition data and preventing data communication by the data communication system when the data transmission system has a lower priority than the transmitting and receiving station; and destination detecting means for receiving and sampling preamble destination data contained within the radio message and generating an output signal when the sampled preamble destination data is unique to the data communication system, wherein the collision resolving means is further configures to exchange unique priority levels between two colliding transmitting and receiving stations whenever two transmitting and receiving stations collide.

10. The data communication system according to claim 9 further comprising storing means for storing the sampled preamble destination data in response to the destination detecting means output signal.

11. The data communication system according to claim 10 further comprising means for assigning unique priority levels to different transmitting and receiving stations.

* * * * *